(12) United States Patent
Yamamoto et al.

(10) Patent No.: US 8,901,197 B2
(45) Date of Patent: Dec. 2, 2014

(54) MODIFIED FLUOROCARBON RESIN COMPOSITION AND MOLDED PRODUCTS

(75) Inventors: Yasuaki Yamamoto, Hitachi (JP); Etsuo Fukuchi, Takahagi (JP); Hiroo Kusano, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 182 days.

(21) Appl. No.: 12/817,822

(22) Filed: Jun. 17, 2010

(65) Prior Publication Data

US 2010/0324217 A1    Dec. 23, 2010

(30) Foreign Application Priority Data

Jun. 18, 2009 (JP) ................................. 2009-145290

(51) Int. Cl.
 C08J 3/28 (2006.01)
 C08J 3/20 (2006.01)
 B29C 35/08 (2006.01)
 C08J 7/12 (2006.01)
 C08L 27/18 (2006.01)
 C08L 79/08 (2006.01)
 C08L 77/10 (2006.01)
 C08L 71/00 (2006.01)

(52) U.S. Cl.
 CPC .. *C08J 3/28* (2013.01); *C08J 7/123* (2013.01); *C08L 79/08* (2013.01); *C08L 27/18* (2013.01); *C08J 2379/08* (2013.01); *C08J 2367/00* (2013.01); *C08J 2377/00* (2013.01); *C08L 77/10* (2013.01); *C08L 71/00* (2013.01)
 USPC ............... 522/156; 522/155; 522/74; 522/79; 522/80; 522/109; 522/110; 264/405; 264/455; 264/459; 264/494; 264/496

(58) Field of Classification Search
 USPC ............... 522/150, 156, 74, 79, 80, 109, 110; 525/416; 264/405, 494, 455, 459, 496
 See application file for complete search history.

(56) References Cited

U.S. PATENT DOCUMENTS

| | | | | | |
|---|---|---|---|---|---|
| 5,308,888 | A | * | 5/1994 | Nishimura et al. | 522/156 |
| 5,329,201 | A | * | 7/1994 | Shirasaki | 310/323.11 |
| 5,985,949 | A | * | 11/1999 | Seguchi et al. | 522/5 |
| 6,204,301 | B1 | | 3/2001 | Oshima et al. | |

FOREIGN PATENT DOCUMENTS

| | | |
|---|---|---|
| JP | 09-278907 | 10/1997 |
| JP | 11-116707 | 4/1999 |
| JP | 2000290409 | 10/2000 |
| JP | 2001172419 | 6/2001 |
| JP | 2009-013402 | 1/2009 |

OTHER PUBLICATIONS

Lauke et al. Effects of Fiber Length and Fiber Orientation Distributions on the Tensile Strength of Short-Fiber Reinforced Polymers. Composite Science & Technology, 56 (1996), pp. 1179-1190.*

* cited by examiner

*Primary Examiner* — Sanza McClendon

(74) *Attorney, Agent, or Firm* — Brundidge & Stanger, P.C.

(57) ABSTRACT

A modified fluorocarbon resin composition and a modified molded product of fluorocarbon resin composition having an excellent abrasion resistivity and low friction property under high pressure, are provided. The modified fluorocarbon resin composition comprises a blend of fluorocarbon resin and aromatic engineering plastic, which is modified by irradiation of ionizing radiation.

6 Claims, No Drawings

MODIFIED FLUOROCARBON RESIN COMPOSITION AND MOLDED PRODUCTS

TECHNICAL FIELD

The present invention relates to a modified fluorocarbon resin composition comprised of fluorocarbon resin and to a modified molded product of fluorocarbon resin composition each having excellent thermal resistivity, abrasion resistivity, and creep resistivity. The present invention further relates to a modified fluorocarbon resin composition comprised of fluorocarbon resin to be used for molding sliding parts; sealing parts; packings; gaskets; and containers, jigs, tubing, etc. for manufacturing semiconductor products, and to a modified molded product of a fluorocarbon resin composition.

BACKGROUND ART

Fluorocarbon resin, particularly polytetrafluoroethylene (PTFE), has been used widely in various applications in the industrial filed and the consumer products because of its low friction properties, high thermal resistivity, excellent electrical properties, high chemical resistivity, and cleanness (anti-staining properties). However, certain cases have not permitted use of fluorocarbon resin because of its abrasion or creep deformation being large under sliding-use conditions or compression-bearing conditions at high temperatures. To deal with this problem, addition of some filler to fluorocarbon resin has been employed to improve its abrasion and creep deformation properties.

However, addition of filler increases friction resistivity and therefore tends to damage the member on the other side of a slide-member. Further, to add filler may invite pollution problem caused by the filler included in abrasion powder generated in sliding motion. JP 09-278907A and JP 11-116707A describe that it is effective in dealing with above stated problems to modify fluorocarbon resin by irradiating the resin with ionizing radiation in inert gas atmosphere with the resin heated over its melting point. The modification in this manner is a very effective method that is able to improve the abrasion resistivity or creep resistivity, or both, without changing the resin's inherent friction resistivity. However, the improvement in abrasion resistivity is not necessarily enough for a use under high pressure over 1 MPa; then, further improvements are desired.

The prior art which relates to the present invention is disclosed in the following documents.
{Patent Literature 1} JP 09-278907 A
{Patent Literature 2} JP 11-116707 A
{Patent Literature 3} JP 2009-13402 A

SUMMARY OF THE INVENTION

Although various other methods are on study to remedy these disadvantages, the situation is not necessarily promising. For example, it is effective to apply a combined use of filler having high elastic coefficient for improvement of the abrasion resistivity under high surface pressures. However, such application still has problems such that such elastic-filler-combined material may damage the member on the other side of a slide-member or may increase the friction coefficient easily causing heat generation on sliding movement. This disadvantage often limits applicability of the material depending on usage.

The object of the present invention is to provide a modified fluorocarbon resin composition and a modified molded product using fluorocarbon resin composition that are, with their excellent abrasion resistivity and low friction properties under high pressure, able to solve above-sated problems.

Means for Solving the Problems

An implementation of the present invention includes a modified fluorocarbon resin composition comprised of a blend of fluorocarbon resin and aromatic engineering plastic, where modification is applied using ionizing radiation.

According to one aspect of the modified fluorocarbon resin composition, wherein the aromatic engineering plastic is a substance selected from the group consisting of aromatic polyester, aromatic polyamide, aromatic ester imide, aromatic polyamide-imide or aromatic polyimide.

According to another aspect of the modified fluorocarbon resin composition, the fluorocarbon resin includes one or more substances selected from the group consisting of polytetrafluoroethylene, polytetrafluoroethylene-fluoroalkoxytrifluoroethylene, and polytetrafluoroethylene-hexafluoropropylene.

According to yet another aspect of the modified fluorocarbon resin composition, the fluorocarbon resin is blended with powder or filament of aromatic engineering plastic.

According to another aspect of the a modified fluorocarbon resin composition, wherein the length of filament of the aromatic engineering plastic is not greater than 300 µm.

According to yet another aspect of the a modified fluorocarbon resin composition, the blending ratio of the fluorocarbon resin to the aromatic engineering plastic is between 0.95/0.05 and 0.6/0.4 in volume.

According to still yet another aspect of the modified fluorocarbon resin composition, the modification applied using ionizing radiation thereto is performed to an irradiation dose between 1 kGy and 10 MGy with the composition being heated to a temperature higher than the melting point of the fluorocarbon resin in inert gas atmosphere of the oxygen concentration of 1330 Pa (10 torr) or lower.

Another implementation of the present invention includes a modified molded product of fluorocarbon resin composition comprised of a blend of fluorocarbon resin and aromatic engineering plastic, where modification is applied using ionizing radiation.

According to another aspect of the modified molded product of fluorocarbon resin composition, the aromatic engineering plastic is a substance selected from the group consisting of aromatic polyester, aromatic polyamide, aromatic ester imide, aromatic polyamide-imide or aromatic polyimide.

According to another aspect of the modified molded product of fluorocarbon resin composition, the fluorocarbon resin includes one or more substances selected from the group consisting of polytetrafluoroethylene, polytetrafluoroethylene fluoroalkoxytrifluoroethylene, and polytetrafluoroethylene-hexafluoropropylene.

According to another aspect of the modified molded product of fluorocarbon resin composition, the fluorocarbon resin is blended with powder or filament of aromatic engineering plastic.

According to another aspect of the modified molded product of fluorocarbon resin composition, the length of filament of the aromatic engineering plastic is not greater than 300 µm.

According to another aspect of the modified molded product of fluorocarbon resin composition, the blending ratio of the fluorocarbon resin to the aromatic engineering plastic is between 0.95/0.05 and 0.6/0.4 in volume.

According to another aspect of the modified molded product of fluorocarbon resin composition, the modification applied using ionizing radiation thereto is performed to an irradiation dose between 1 kGy and 10 MGy with the molded product being heated to a temperature higher than the melting point of the fluorocarbon resin in inert gas atmosphere of the oxygen concentration of 1330 Pa (10 torr) or lower.

The present invention contributes greatly to the widening of the application range of fluorocarbon resin because the invention enables fluorocarbon resin to provide an excellent abrasion resistivity and low friction properties even under high pressure.

DETAILED DESCRIPTION OF THE PREFERRED EMBODIMENTS

The following provides a detailed explanation of the preferred mode of embodiment of the present invention.

A diligent study by the inventor of the present invention has found that a blend of fluorocarbon resin and powder or filament of aromatic engineering plastic and a molded product manufactured using the blend of such materials provide significantly improved abrasion resistivity under high pressure when the blend and the molded product are irradiated by ionizing radiation at a temperature over the melting point of the fluorocarbon resin used therein. This finding has then lead to the present invention.

A detail of mechanism from which this effect would be produced is not yet known. However, the effect is supposed to be ascribable to that the irradiation causes fluorocarbon resin to cross-link and further causes to form another cross-links between fluorocarbon resin and aromatic engineering plastic.

Fluorocarbon resin applicable to the present invention includes polytetrafluoroethylene (PTFE), polytetrafluoroethylene-fluoroalkoxytrifluoroethylene (PFA), and polytetrafluoroethylene-hexafluoropropylene (FEP).

Above stated PTFE includes such a PTFE as contains polymeric units derived from copolymerizing monomer, such as perfluoro (alkylvinylether), hexafluoropropylene (perfluoroalkyl)ethylene, and chlorotrifluoroethylene, in a quantity not greater than 0.2 mol-%. In this composition of fluorocarbon resin, it is practically probable that its molecular structure may involve a small amount of a third substance.

As regards aromatic engineering plastics to be employed in the present invention, those plastics having abrasion resistivity such as aromatic polyester, aromatic polyamide, aromatic ester-imide, aromatic polyamide-imide, and aromatic polyimide are preferable.

The modified fluorocarbon resin composition and the modified molded product using such fluorocarbon resin composition of the present invention explained above can be manufactured through modification of a composition comprised of blend of fluorocarbon resin and powder or filament of aromatic engineering plastic blended by dry-blending, wet-blending, or melt-blending and a molded product comprising such composition, by irradiating ionizing radiation thereto to an irradiation dose between 1 kGy and 10 MGy with the composition or the molded product heated to a temperature higher than the melting point of the fluorocarbon resin used therein in inert gas atmosphere of the oxygen concentration of 1330 Pa (10 torr) or lower.

The irradiation of the ionizing radiation is applied with the composition or the molded product heated to a temperature higher than the melting point of the fluorocarbon resin used therein in inert gas atmosphere of the oxygen concentration of 1330 Pa (10 torr) or lower; the irradiation dose should preferably be within the range of 1 kGy to 10 MGy. As the ionizing radiation source, the present invention uses gamma (γ) radiation, electron beam, X-ray, neutron radiation, or high-energy ion beam.

In irradiating by the ionizing radiation, the composition comprised of blend of fluorocarbon resin and powder or filament of aromatic engineering plastic and a molded product comprising such composition should be heated to a temperature higher than the crystalline melting point of the fluorocarbon resin used therein. For example, where PTFE is employed as the fluorocarbon resin, the irradiation is required to be performed at temperatures higher than 327° C. that is the melting point of PTFE; or where PFA or FEP is used, the irradiation should be carried out at temperatures higher than their specific melting point of 310° C. or 275° C. respectively. Heating to a temperature higher than the melting point excites the molecular motion of main chains constituting the fluorocarbon resin. As a result of this, cross-linking reaction among molecules is encouraged to occur with efficient acceleration. On the other hand, however, an excessive heating invites scission and decomposition of the main chains. Therefore, heating should be kept below the limit of temperatures 10 to 30° C. higher than the melting point of the fluorocarbon resin used therein.

In the present invention, a preferred blending ratio of the fluorocarbon resin to the aromatic engineering plastic is 0.95/0.05 to 0.6/0.4 in terms of volume. If the ratio of the aromatic engineering plastic is smaller than this, it becomes difficult to give a high abrasion resistivity under higher pressure; contrary, if in excess of this, the elongation property significantly lowers causing problems such as being mechanically brittle.

The average length (50% on cumulative frequency) of the filament of the aromatic engineering plastic is preferred to be 10 to 300 μm. Where the average filament length is shorter than 10 μm, aggregation will easily occur while blending or dispersing with considerably lowered physical properties. In contrast, lengths longer than 300 μm makes homogeneous blending difficult or causes great reduction in contribution to the abrasion resistivity improvement.

For similar reasons, the average grain diameter of powder of the aromatic engineering plastic is preferred to be in a range of 1 to 100 μm.

Although there is no particular mention in the description of the present invention, it is feasible to add fillers, oxidation inhibitors, solid lubricants, or coloring agents.

The application of the modified fluorocarbon resin composition and the modified molded products comprised of such fluorocarbon resin composition by the present invention are in the expectation that they will be applicable to wide usage such as industrial machinery, sliding members in office automation equipment, and various parts in semiconductor manufacturing equipment.

EMBODIMENT

The following provides explanation of Embodiments 1 to 4 of the present invention and Comparison examples 1 to 7 referring to Table 1.

TABLE 1

| | | Blending amounts in volume ratio | | | | | | | | | | |
|---|---|---|---|---|---|---|---|---|---|---|---|---|
| | | Embodiment | | | | Comparison Example | | | | | | |
| Description | | 1 | 2 | 3 | 4 | 1 | 2 | 3 | 4 | 5 | 6 | 7 |
| PTFE *1 | | 90 | 70 | 85 | 80 | 90 | 100 | 97 | 50 | | 80 | 70 |
| PEEK *2 | | 10 | 30 | | | 10 | | 3 | 50 | 100 | | |
| PAI *3 | | | | 15 | | | | | | | | |
| Aromatic polyamide *4 | | | | | 20 | | | | | | | 20 |
| Aromatic polyamide *5 | | | | | | | | | | | 20 | |
| Modified PTFE *6 | | | | | | | | | | | | 10 |
| Irradiation dose (kGy) | | 120 | 120 | 150 | 180 | 0 | 120 | 120 | 120 | 120 | 120 | 0 |
| Slide properties | Wear rate *7 | 230 | 110 | 190 | 150 | 4200 | 520 | 480 | 300 | 4500 | 660 | 590 |
| | Friction coefficient | 0.26 | 0.31 | 0.28 | 0.30 | 0.29 | 0.20 | 0.22 | 0.53 | 0.64 | 0.39 | 0.28 |
| Tensile properties | Tensile strength (MPa) | 23.7 | 19.2 | 19.5 | 19.1 | 17.9 | 24.2 | 23.6 | 28 | 90 | 10.9 | 17.4 |
| | Elongation (%) | 320 | 120 | 210 | 50 | 290 | 380 | 350 | 10 or less | 40 | 10 or less | 110 |

*1 Teflon ™ 7AJ (Dupont-Mitsui Fluorochemicals Company, Ltd.)
*2 PEEK ™ (Polyetheretherketone resin, Victrex 150XF; Victrex Manufacturing, Ltd.; Average grain diameter 50 μm)
*3 PAI (Polyamide-imide resin, Toron ® 4000TF; Solvay Advanced Polymers, LLC; Average grain diameter 35 μm)
*4 Twaron ® TW1088 (Teijin, Ltd.; Average filament length 250 μm)
*5 Twaron ® TW1080 (Teijin, Ltd.; Average filament length 6000 μm)
*6 In a form of powder having average grain diameter of 20 μm; irradiated by electron beam (acceleration voltage 1.5 MeV) to 120 kGy at temperature of 340° C. in nitrogen atmosphere with oxygen concentration $10^{-5}$ mol/g
*7 ×$10^{-8}$ $mm^3$/Nm Table 1 lists the results of measurements of Embodiments 1 to 4 and Comparison examples 1 to 7 for (1) slide properties and (2) tensile properties. The embodiments and comparison are provided in a form of molded products having different blending amount and underwent different dose of irradiation of ionizing radiation as detailed in the successive description for preparation of them.

First, the method of preparing the molded product listed in Table 1 will be explained.

The fluorocarbon resin PTFE used was Teflon™ 7AJ (Dupont-Mitsui Fluorochemicals Company, Ltd.). The powder of aromatic engineering plastics used were: PEEK™ (Polyetheretherketone resin, Victrex 150XF; Victrex Manufacturing, Ltd.; Average grain diameter 50 μm), and PAI (Polyamide-imide resin, Toron® 4000TF; Solvay Advanced Polymers, LLC; Average grain diameter 35 μm). The filaments of aromatic engineering plastics used were: Twaron® TW1088 (Teijin, Ltd.; Average filament length 250 μm) or Twaron® TW1080 (Teijin, Ltd.; Average filament length 6000 μm).

The modified PTFE is a powder having average grain diameter of 20 μm. The powder is prepared by irradiating fluorocarbon resin PTFE by electron beam (acceleration voltage 1.5 MeV) to 120 kGy at a temperature of 340° C. in nitrogen atmosphere with oxygen concentration of 10 Pa ($10^{-5}$ mol/g).

Embodiment 1

PTFE and PEEK were blended in a volume-% ratio of 90:10. The blend was then cooled down to 5° C. before successive treatment. The cooled blend was then charged in a mixer held at 5° C. The mixer was operated for three minutes at 3000 rpm to perform dry-blending. After mixing operation, the blend was returned to a room temperature of 25° C. and then was compressed at 50 MPa to obtain a compact. The compact thus obtained was calcined at 360° C. for five hours followed by a hot-forming treatment to obtain a molded product (100 mm in diameter and 10 cm in height).

The molded product was skived to provide a sheet in a thickness of 1 mm for property evaluation. The skived sheet underwent an irradiation by electron beam (acceleration voltage 1.5 MeV) to 120 kGy at a temperature of 340° C. in nitrogen atmosphere with oxygen concentration of 10 Pa ($10^{-5}$ mol/g) to obtain a modified fluorocarbon resin sheet.

Embodiment 2

A modified fluorocarbon resin sheet was prepared using a blend of PTFE and PEEK blended in a volume-% of 70:30. The blend was then treated in the same manner as in Embodiment 1 undergoing an irradiation by electron beam to 120 kGy to obtain the modified fluorocarbon resin sheet.

Embodiment 3

A modified fluorocarbon resin sheet was prepared using a blend of PTFE and PEEK blended in a volume-% of 85:15. The blend was then treated in the same manner as in Embodiment 1 to obtain the sheet except in that the absorbed dose of the electron beam irradiation was 150 kGy.

Embodiment 4

A modified fluorocarbon resin sheet was prepared using a blend of PTFE and aromatic polyamide (average filament length thereof was 250 μm) blended in a volume-% of 80:20. The blend was then treated in the same manner as in Embodiment 1 to obtain the sheet except in that the absorbed dose of the electron beam irradiation was 180 kGy.

Comparison Example 1

A fluorocarbon resin sheet was prepared using the same blend formula and treatment as in Embodiment 1 except in that the electron beam irradiation was not applied.

Comparison Example 2

A modified fluorocarbon resin sheet was prepared from a molded product of PTFE only. The molded product underwent an irradiation by electron beam to 120 kGy in the same manner as in Embodiment 1 to obtain the modified fluorocarbon resin sheet.

Comparison Example 3

A modified fluorocarbon resin sheet was prepared using a blend of PTFE and PEEK blended in a volume-% of 97:3. The blend was then treated in the same manner as in Embodiment 1 undergoing an irradiation by electron beam to 120 kGy to obtain the modified fluorocarbon resin sheet.

Comparison Example 4

A modified fluorocarbon resin sheet was prepared using a blend of PTFE and PEEK blended in a volume-% of 50:50. The blend was then treated in the same manner as in Embodiment 1 undergoing an irradiation by electron beam to 120 kGy to obtain the modified fluorocarbon resin sheet.

Comparison Example 5

A modified fluorocarbon resin sheet was prepared using PEEK only undergoing an irradiation by electron beam to 120 kGy in the same manner as in Embodiment 1.

Comparison Example 6

A modified fluorocarbon resin sheet was prepared substituting the aromatic polyamide (average filament length thereof was 250 μm) in Embodiment 4 with aromatic polyamide, of which average filament length is 6000 μm, with an irradiation by electron beam to 120 kGy instead.

Comparison Example 7

A fluorocarbon resin sheet was provided by skiving a molded product that was prepared changing the volume of PTFE in Embodiment 4 to 70% and adding 10 volume-% of modified PTFE thereto. The irradiation was not applied to the sheet.

The following will discuss measured properties of modified fluorocarbon resin sheets and fluorocarbon sheets thus prepared. The numbers of measurements for tensile strength and the other properties were five and three on each of sheets, respectively. The arithmetic average over the five measurements or the three measurements was taken as the average to represent property of the sheet.

(1) Slide Properties

Measuring was conducted using a thrust abrasion tester. The measuring was performed pursuant to JIS K 7218 as described below:

A cylindrical ring (25.6 mm in outer diameter and 20.6 mm in inner diameter) of stainless steel SUS304 was prepared, and then a test piece (25.6 mm in outer diameter, 20.6 mm in inner diameter, and 1 mm in thickness) was prepared. The test piece was stuck on the cylindrical ring. A stainless steel plate of SUS304 (30 mm in height, 30 mm in width, 5 mm in thickness, and 2 μm in average surface roughness) was prepared as the member on the other side of a frictional combination with the test piece.

Other conditions were:

the surface pressure was 1 MPa, the rim speed was 0.5 m/s, the measuring time length was 24 hours, the atmosphere was dry, and the temperature was a room temperature. On completion of the thrust abrasion test, the test pieces were weighed to calculate the wear rate from the weight variation and the friction coefficient was calculated from the torque.

(2) Tensile Properties

The test piece was prepared using a sheet having the same thickness of 1 mm as in the above-stated abrasion test. The sheet was left at 23° C. for 24 hours and then prepared into a No. 3 dumbbell-shape test piece pursuant to JIS K 7113 to place under the tensile test. Each of five test pieces was measured for tensile strength (breaking point) and tensile elongation at a pulling rate of 50 mm/min; measurements are arithmetically averaged and indicated in the table.

Each of Embodiments 1 to 4 of the present invention has excellent abrasion resistivity with small wear rate in the slide properties under dry condition, superb low friction property with small friction coefficient, and an elongation over 50% in the tensile test.

In contrast, Comparison example 1 is a non-modified sheet (molded product) prepared without electron beam irradiation. The example exhibits a specific ware rate of as large as $4200 \times 10^{-8}$ mm$^3$/Nm in the slide properties, which means that the abrasion resistivity under high pressure is largely inferior compared to Embodiment 1.

It is therefore known that these measurements teach that blending fluorocarbon resin with aromatic engineering resin and irradiating the blend by ionizing radiation largely improves the abrasion resistivity under high pressure.

Comparison example 2 is a sheet (molded product) prepared using PTFE only. The example showed a specific ware rate of $520 \times 10^{-8}$ mm$^3$/Nm in the slide properties, which was smaller than that of Comparison example 1, since this example underwent electron beam irradiation. Under high pressure however, this abrasion resistivity is still significantly inferior compared to that of Embodiment 1 in which aromatic engineering plastic is blended.

It is therefore known that a sheet (molded product) prepared using only fluorocarbon resin cannot provide a largely improved abrasion resistivity under high pressure even though irradiation by ionizing radiation is applied, in contrast to the case wherein blend of fluorocarbon resin with aromatic engineering plastic is used applying irradiation by ionizing radiation.

Comparison example 3 is an example in which the volume-% of PEEK is 3%, which is smaller than 5%. The specific ware rate in slide properties thereof is as large as $480 \times 10^{-8}$ mm$^3$/Nm, which means the abrasion resistivity under high pressure is inferior.

It is therefore known that the volume-% of aromatic engineering plastic to fluorocarbon resin should be 5% or more.

Comparison example 4 is an example in which the volume-% of PEEK is 50%, which is over 40%. The wear rate in slide properties thereof is as large as $300 \times 10^{-8}$ mm$^3$/Nm and friction coefficient thereof is as large as 0.53, which mean the abrasion resistivity under high pressure is inferior. Further, tensile elongation in tensile properties thereof is as low as 10% or less, which means the Comparison example 4 is brittle.

It is therefore known that the volume-% of aromatic engineering plastic to fluorocarbon resin should be 40% or less.

According to results of Comparison examples 3 and 4, it is known that the volume ratio of fluorocarbon resin to aromatic engineering plastic should be between 0.95/0.05 and 0.6/0.4.

Comparison example 5 is an example prepared using PEEK only. The specific ware rate in the slide properties thereof is as large as $4500 \times 10^{-8}$ mm$^3$/Nm and the friction coefficient thereof is as large as 0.64. Consequently, heat generation causes the specific ware rate to be large with inferior abrasion resistivity. Further, the tensile elongation in tensile properties thereof is as low as 40% or less.

It is therefore known that a sheet (molded product) prepared using only PEEK cannot provide a largely improved abrasion resistivity or low friction property under high pressure even though irradiation by ionizing radiation is applied, in contrast to the case wherein blend of fluorocarbon resin with aromatic engineering plastic is used applying irradiation by ionizing radiation.

Comparison example 6 is an example in which the average length of filament of aromatic engineering plastic is 6000 μm, which is over 300 μm. The specific ware rate in slide properties thereof is as large as $660 \times 10^{-8}$ mm$^3$/Nm, which means its abrasion resistivity under high pressure is inferior compared to Embodiment 4. Further, the tensile strength in tensile properties thereof is as low as 10.9 MPa and the elongation is as low as 10% or less, which means Comparison example 6 is brittle.

It is therefore known that the average filament length of aromatic engineering plastic should be 300 μm or shorter.

Comparison example 7 is a non-modified sheet of fluorocarbon resin prepared, but without electron beam irradiation, using blend of PTFE, modified PTFE, and aromatic polyamide blended in a volume-% of 70:20:10 respectively. The specific ware rate in slide properties thereof is as large as $590 \times 10^{-8}$ mm$^3$/Nm, which means its abrasion resistivity under high pressure is inferior compared to Embodiment 4. Further, the tensile strength in tensile properties thereof is as low as 17.4 MPa.

It is therefore known that a sheet of fluorocarbon resin manufactured from the molded product prepared using modified fluorocarbon resin cannot provide a largely improved abrasion resistivity under high pressure, in contrast to a sheet of modified fluorocarbon resin prepared using fluorocarbon resin and aromatic engineering plastic followed by the applying of electron beam irradiation.

The invention claimed is:

1. A modified fluorocarbon resin composition comprising:
   a blend of fluorocarbon resin and aromatic engineering plastic,
   wherein a blending ratio of said fluorocarbon resin to said aromatic engineering plastic is between 0.95/0.05 and 0.6/0.4 in volume,
   wherein modification is applied using ionizing radiation,
   wherein the fluorocarbon resin is blended with a filament of aromatic engineering plastic,
   wherein a length of the filament of aromatic engineering plastic is not greater than 300 μm, and
   wherein said aromatic engineering plastic is a substance selected from the group consisting of aromatic polyester, aromatic polyamide, aromatic ester imide, aromatic polyamide-imide or aromatic polyimide.

2. The modified fluorocarbon resin composition according to claim 1, wherein said fluorocarbon resin includes one or more substances selected from the group consisting of polytetrafluoroethylene, polytetrafluoroethylene-fluoroalkoxytrifluoroethylene, and polytetrafluoroethylene-hexafluoropropylene.

3. The modified fluorocarbon resin composition according to claim 1, wherein said modification applied using ionizing radiation thereto is performed to an irradiation dose between 1 kGy and 10 MGy with said composition being heated to a temperature higher than the melting point of said fluorocarbon resin in inert gas atmosphere of the oxygen concentration of 1330 Pa (10 torr) or lower.

4. A modified molded product of fluorocarbon resin composition comprising:
   a blend of fluorocarbon resin and aromatic engineering plastic,
   wherein a blending ratio of said fluorocarbon resin to said aromatic engineering plastic is between 0.95/0.05 and 0.6/0.4 in volume,
   wherein modification is applied using ionizing radiation,
   wherein the fluorocarbon resin is blended with a filament of aromatic engineering plastic,
   wherein a length of the filament of aromatic engineering plastic is not greater than 300 μm, and
   wherein said aromatic engineering plastic is a substance selected from the group consisting of aromatic polyester, aromatic polyamide, aromatic ester imide, aromatic polyamide-imide or aromatic polyimide.

5. The modified molded product of fluorocarbon resin composition according to claim 4, wherein said fluorocarbon resin includes one or more substances selected from the group consisting of polytetrafluoroethylene, polytetrafluoroethylene-fluoroalkoxytrifluoroethylene, and polytetrafluoroethylene-hexafluoropropylene.

6. The modified molded product of fluorocarbon resin composition according to claim 4, wherein said modification applied using ionizing radiation thereto is performed to an irradiation dose between 1 kGy and 10 MGy with said molded product being heated to a temperature higher than the melting point of said fluorocarbon resin in inert gas atmosphere of the oxygen concentration of 1330 Pa (10 torr) or lower.

* * * * *